(No Model.) 2 Sheets—Sheet 1.

J. DESMOND.
VELOCIPEDE.

No. 524,019. Patented Aug. 7, 1894.

Witnesses

Inventor
John Desmond (No Model.) 2 Sheets—Sheet 2.

J. DESMOND.
VELOCIPEDE.

No. 524,019. Patented Aug. 7, 1894.

Witnesses
A. L. Hobbie
C. F. Barthel

Inventor
John Desmond
By Thos. S. Sprague & Son
Attys.

UNITED STATES PATENT OFFICE.

JOHN DESMOND, OF DETROIT, MICHIGAN, ASSIGNOR TO S. OLIN JOHNSON, OF SAME PLACE.

VELOCIPEDE.

SPECIFICATION forming part of Letters Patent No. 524,019, dated August 7, 1894.

Application filed August 7, 1893. Serial No. 482,576. (No model.)

*To all whom it may concern:*

Be it known that I, JOHN DESMOND, a citizen of the United States, residing at Detroit, in the county of Wayne and State of Michigan, have invented certain new and useful Improvements in Velocipedes, of which the following is a specification, reference being had therein to the accompanying drawings.

The invention consists in the peculiar construction of a velocipede comprising a single drive wheel, a frame supported thereon and safety wheels in front and rear thereof. It might be described as a monocycle with front and rear safety wheels.

The invention further consists in the peculiar construction of the frame, the drive gear, the safety wheels and the bearings, and further in the peculiar construction, arrangement and combination of the various parts, all as more fully hereinafter described.

Figure 1:
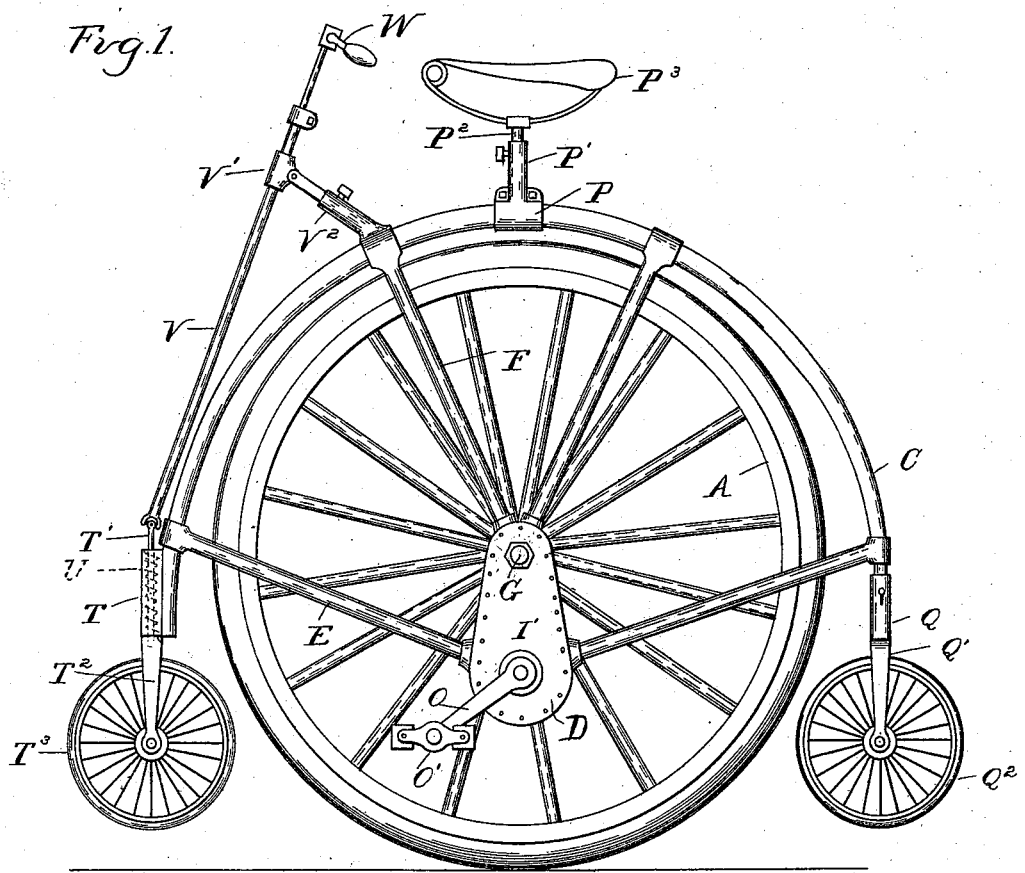
Figure 2:
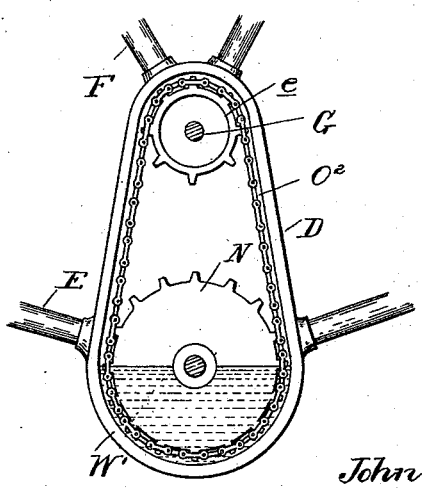
Figure 3:
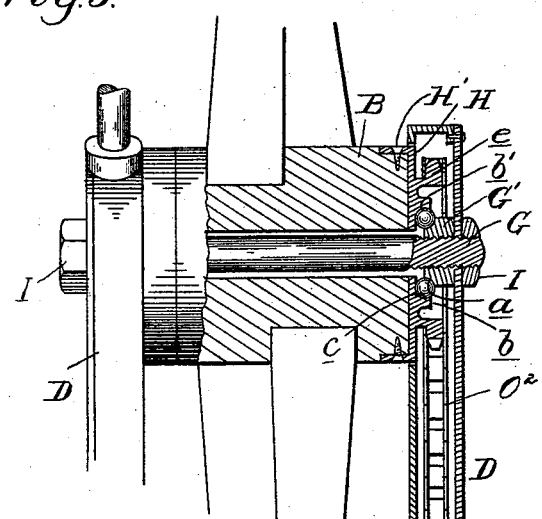
Figure 4:
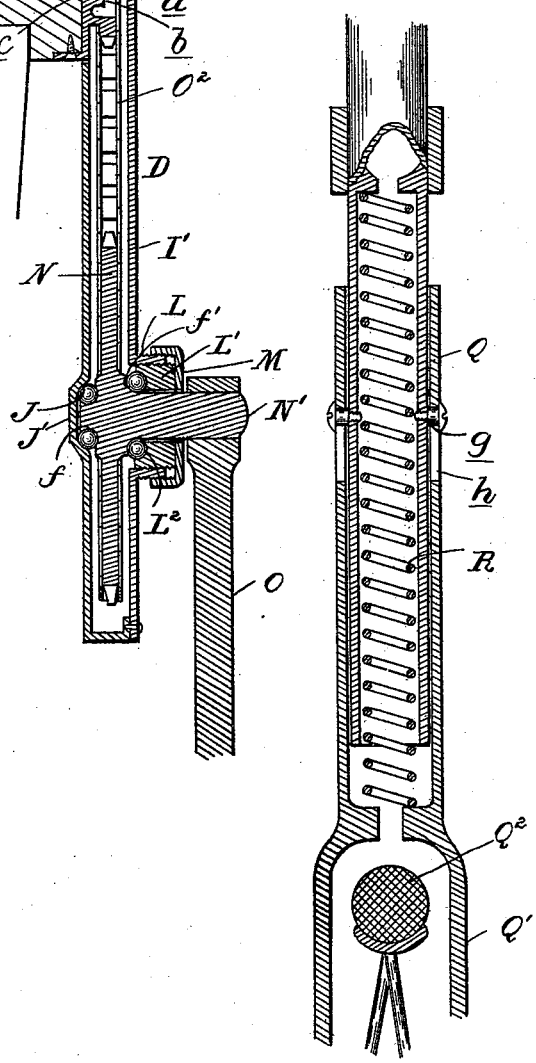

In the drawings, Figure 1 is a side elevation of my improved device. Fig. 2 is an elevation of the gear box its outer casing being removed. Fig. 3 is a section through said box and the bearing of the wheel and crank shaft. Fig. 4 is a vertical section through the fork of the rear safety wheel.

A is the wheel. I have shown a wooden wheel. It may be of metal if desired.

B is the hub.

The frame of my wheel is composed of the bent semi-circular back bone C, a gear box D, and the braces E, F, connecting the back bone and gear box. The braces E connect to the box at its lower end on opposite sides and at their outer ends connect to the lower ends of the fork. The braces F extend upward radially from the top of the box to intermediate points on the back bone. The frame is supported on the wheel, through a ball bearing, shown in detail in Fig. 3.

G is the wheel shaft passing through a central aperture in the wheel hub and suitably screw threaded to receive the nuts G' having ball races $a$ on their inner ends.

H is a flanged cap on the hub B of the wheel secured in position by screws H'. This cap is centrally apertured to allow the shaft G to pass through. These caps are provided on their inner faces with flanges B on the inner face of which are formed ball races $c$ complementary to the races $a$ on the nuts. $e$ are sprocket wheels, also preferably formed integral with the caps.

The outer ends of the wheel shaft are secured to the gear box or bracket, by means of the nuts I, clamping the face plate I' of said bracket against the nuts G'. (See Fig. 3.)

The face plate forms a cover for the gear box which is thus entirely protected from dust and dirt.

J are ball races formed at the margin of a cup shaped boss J' near the lower end of the gear boxes. Opposite this is a nipple L, screw threaded interiorly to receive the race nuts L' and exteriorly to receive the cap M. The nuts L' are provided with suitable ball races $L^2$.

N is a gear wheel having ball races $f, f$, formed on opposite sides of its hub, complementary to the races $L^2$ and J.

N' is a stub shaft projecting from the hub of the gear wheel, through the cap M.

O is the pedal crank provided at its end with suitable pedals O'.

$O^2$, is a sprocket chain in the gear box extending over the wheels $e$ and N.

P is a clamp secured to the back bone, centrally over the wheels, and adjustable thereon. This clamp carries a sprocket P', in which the saddle post $P^2$ adjustably engages.

$P^3$ is the saddle at the upper end of the post.

The rear lower end of the backbone forms a post, with which a tubular head Q of the fork Q' slidingly engages. $Q^2$ is a rear safety wheel journaled in the fork Q'.

R is a spring (see Fig. 4) bearing at one end against the head Q, and at its other end against the back bone, acting to hold the safety wheel down to its lowest normal position. The vertical movement of the safety wheel is limited by pins $g$ on the back bone engaging slots $h$ in the head. This gives me a resiliently backed support for this safety wheel.

At the lower front end of the back bone is a socket T adapted to receive a post T' formed at the upper end of the fork T² of the front safety wheel T³. This wheel is held normally in line with the wheel A, by the tension of a spring U, coiled about the post T' in the socket T, and secured to the post and socket at opposite ends.

V is a steering shaft swiveled to the upper end of the post T' and passing through an adjustable bearing V' slidingly secured in a socket V² secured to the back bone. W is a handle bar on the upper end of the shaft V.

The parts thus combined comprise a monocycle having front and rear safety wheels Q², T³. The frame which supports the rider and carries the safety wheels, in its middle or normal position, will carry or suspend the safety wheels free of the ground, it being the object of the device that the rider shall ride only upon the main wheel A, except in mounting or dismounting, when the safety wheel Q² is brought down or when he desires to steer the device more or quicker than can be done by shifting his weight, when the front safety wheel is brought down. If the rider should lose his balance either forward or backward the safety wheels would again be called into play. To bring these wheels into use the rider has simply to shift his weight forward or backward by bending his body.

The proper center of gravity of any rider in relation to the wheel A and in any position may be obtained by shifting the seat upon the back bone.

The device is driven by turning the cranks O, which through the connections described turn the wheel A. The lower end of the gear box forms a cup W' which I preferably fill with oil (as shown in Fig. 2) up to the line of the crank shaft and in which the gear wheel and sprocket chain run.

What I claim as my invention is—

1. In a velocipede, the combination of a frame comprising a single piece back bone extending across the front and rear and over the wheel, of a seat supported centrally thereon and longitudinally adjustable upon the backbone, substantially as described.

2. In a velocipede, the combination with a frame, wheel and its hub, of depending hollow brackets on the opposite sides of the wheel, a shaft passing through the hub of the wheel and on which the brackets are secured, sprocket wheels rigid on the hub, ball bearings interposed between the shaft and sprocket wheels, sprocket wheels journaled in the lower ends of the brackets, cranks on the lower sprocket wheels, chains connecting the sprockets, and braces extending from the brackets to the frame, substantially as described.

3. In a velocipede, the combination with the drive wheel and frame, of a steering wheel in front of the drive wheel, a fork for the steering wheel a steering shaft pivotally secured to the fork of the steering wheel, and means for adjusting the position of the steering shaft independent of the steering wheel consisting of a socket and pin connection between the same and frame and a clamping device on the socket for retaining the pin in its adjusted position in the socket, substantially as described.

In testimony whereof I affix my signature in presence of two witnesses.

JOHN DESMOND.

Witnesses:
JAMES WHITTEMORE,
OTTO F. BARTHEL.